(No Model.)
H. BIVIN.
HAND CORN PLANTER AND FERTILIZER DISTRIBUTER.
No. 341,217. Patented May 4, 1886.
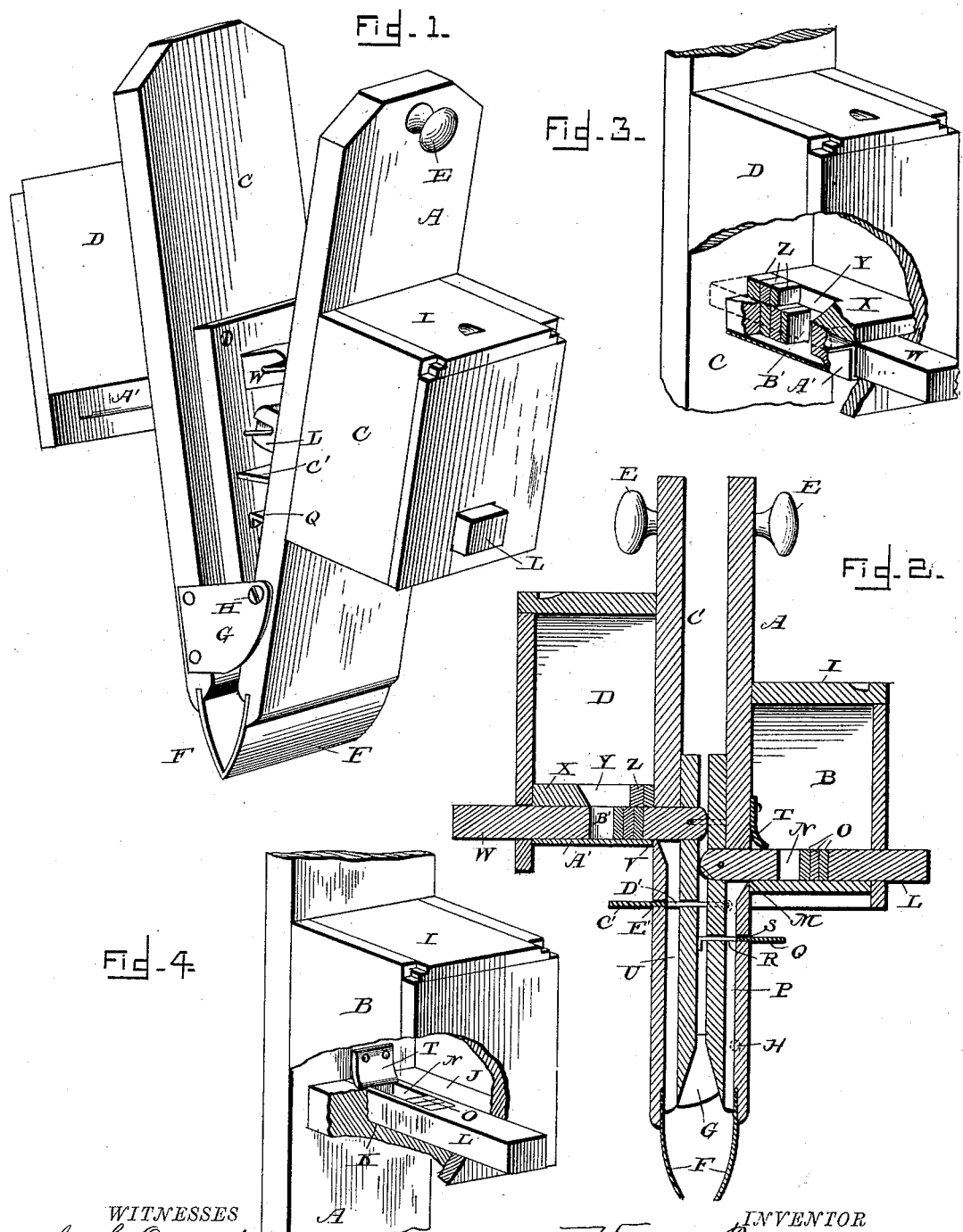
WITNESSES
C. H. Ourand
Edward Stanton
INVENTOR
Henry Bivin
By Louis Bagger & Co.
Attorneys.

UNITED STATES PATENT OFFICE.

HENRY BIVIN, OF CURRAN, ILLINOIS.

HAND CORN-PLANTER AND FERTILIZER-DISTRIBUTER.

SPECIFICATION forming part of Letters Patent No. 341,217, dated May 4, 1886.

Application filed February 8, 1886. Serial No. 191,194. (No model.)

*To all whom it may concern:*

Be it known that I, HENRY BIVIN, a citizen of the United States, and a resident of Curran, in the county of Sangamon and State of Illinois, have invented certain new and useful Improvements in Hand Corn-Planters and Fertilizer-Distributers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hand corn-planter and fertilizer-distributer. Fig. 2 is a vertical sectional view of the same. Fig. 3 is a perspective detail view, with portions broken away, of the fertilizer-box and slide; and Fig. 4 is a similar view of the seed-box and its slide.

Similar letters of reference indicate corresponding parts in all the figures.

My invention has relation to that class of seed-planters in which the seed-box is secured upon a board which is held at its upper end with one hand, and in which the seed-slide is pivoted to another board or arm, which is pivoted at its lower end to the lower end of the board and provided with opening-blades, while its upper end is held with the other hand of the operator, who, by forcing the upper ends of the arms together, will open a hill and drop the seed in the same, while by drawing the arms apart the seed will be fed into the cups of the slide; and it consists in the improved construction and combination of parts of such a planter which will plant corn and at the same time drop fertilizer into the hill, and in which the cups in the slides may be adjusted to different sizes, as hereinafter more fully described and claimed.

In the accompanying drawings, the letter A indicates the board having the seed-box B, while C indicates the board having the fertilizer-box D, and the upper ends of these arms or boards are provided with suitable handles, E E, by which they may be handled, while their lower ends are provided with opening-blades F F, and are connected by means of flanges or lips G G, projecting from the lower ends of the edges of one board, and having pivotal bolts H passing through their ends and into the edges of the other board, so that the opening-blades will be spread when the upper ends of the arms or boards are closed together.

The seed-box B is provided with a sliding cover, I, and its bottom J is formed with a groove, K, in which the seed-slide L reciprocates. This seed-slide passes through an aperture, M, in the arm, and has its inner end hinged or pivoted to the inner side of the opposite arm, and the seed-slide is provided with a cup or perforation, N, which may be adjusted to its desired capacity by the insertion of blocks, O, of suitable sizes in one end of the cup.

The inner side of the arm having the seed-box is formed with a vertical tube or channel, P, with the upper end of which the seed-cup will register when the arms are drawn apart, and a slide, Q, having an aperture, R, near its inner end, is secured at its inner end to the opposite arm, and slides in transverse slots S in the arm and sides of the tube.

A brush, T, of leather or of any suitable material, is secured at the upper edge of the aperture in the arm through which the seed-slide passes, the said brush leveling the contents of the cup, and preventing any grains from being crushed between the upper edge of the aperture and the wall of the cup.

The arm provided with the fertilizer-box is formed with a tube or channel, U, extending from a perforation, V, in the arm, through which the fertilizer-slide W passes, and this slide is pivotally connected at its inner end to the inner side of the arm carrying the seed-box.

The bottom X of the fertilizer-box is formed with a slot or perforation, Y, which may be adjusted to its desired size by means of removable blocks Z, fitting in one end of the aperture or slot, and the slide, which reciprocates in a suitable way, A', under the bottom of the fertilizer-box, has a cup, B', which may register with the aperture in the bottom of the box, and with the upper end of the tube or channel.

A slide, C', having an aperture, D', near its inner end, is secured with its inner end to the inner side of the arm having the seed-box, and slides in transverse slots E' in the arm and sides of the tube.

The fertilizer-box is preferably secured to its arm a short distance above the seed-box, so that the slides for the fertilizer are above the slides for the corn, and the fertilizer will consequently be dropped on top of the corn.

When the planter is to be used, the seed-cup and the aperture in the bottom of the fertilizer-box are adjusted to their desired capacity by means of the blocks, which are inserted into the ends of the cup and of the aperture, and after having filled the seed-box and fertilizer-box the planter may be taken hold of by the handles and the arms drawn apart, when the opening-blades will be drawn together and the contents of the cups in the slides dropped through the tubes upon the lower slides. When, now, the opening-blades are inserted into the surface of the soil at the point where the hill is to be planted, the arms are forced together, opening the soil by the spreading-blades and withdrawing the lower slides, which will allow the seed and fertilizer to drop, whereupon the arms may again be raised and forced apart. The slides will fill their respective cups, when the seed and fertilizer are dropped, and will allow them to drop upon the lower slides as the arms are forced apart again. In this manner the hill will be opened by the blades, when the seed is dropped, and the soil may be allowed to fall back over the grain by closing the blades in forcing the upper ends of the arms apart while withdrawing the planter from the hill.

Having thus described my invention, I claim and desire to secure by Letters Patent of the United States—

In a hand corn-planter and fertilizer-distributer, the combination of two arms having handles at their upper ends, and having their lower ends provided with opening-blades and hinged together by means of projecting lips, and formed with longitudinal tubes upon their inner sides opening at their lower ends, a seed-box upon one arm having a groove in its bottom and a brush, a seed-slide having an adjustable cup and pivotally connected at its inner end to the inner side of the opposite arm, a slide having an opening near the inner end, and having its inner end secured to the arm carrying the fertilizer-box and sliding in slots in the seed-tube, a fertilizer-box upon the other arm having an adjustable aperture in its bottom, a slide having a cup registering with the aperture, and having its inner end pivotally connected to the seed-arm, and a slide having an aperture near its inner end and sliding in slots of the fertilizer-tube, and secured at its inner end to the seed-arm, as and for the purpose shown and set forth.

In testimony that I claim the foregoing as my own I have hereunto affixed my signature in presence of two witnesses.

HENRY BIVIN.

Witnesses:
 RICHARD C. SMITH,
 LEONARD G. FOSTER.